(12) United States Patent  (10) Patent No.: US 7,191,731 B2
Cote  (45) Date of Patent: Mar. 20, 2007

(54) TUBE BIRD FEEDER

(76) Inventor: Paul Cote, 18 Valleyview Road, Knowlton, Quebec (CA) J0E 1V0

( * ) Notice: Subject to any disclaimer, the term of this patent is extended or adjusted under 35 U.S.C. 154(b) by 0 days.

(21) Appl. No.: 11/399,202

(22) Filed: Apr. 6, 2006

(65) Prior Publication Data

US 2006/0260553 A1  Nov. 23, 2006

(30) Foreign Application Priority Data

May 17, 2005  (CA) .................................. 2507546

(51) Int. Cl.
*A01K 61/02* (2006.01)
(52) U.S. Cl. ..................................................... 119/57.9
(58) Field of Classification Search ............... 119/57.8, 119/57.9, 51.01, 52.2, 52.4, 52.3
See application file for complete search history.

(56) References Cited

U.S. PATENT DOCUMENTS

| | | | | |
|---|---|---|---|---|
| 427,165 A * | 5/1890 | Fickett | .................. | 222/230 |
| 1,547,953 A * | 7/1925 | Palmer | .................. | 222/510 |
| 2,298,398 A * | 10/1942 | Marshaus | .................. | 119/51.5 |
| 2,711,217 A * | 6/1955 | Gaty | .................. | 119/51.15 |
| 2,847,147 A * | 8/1958 | Land | .................. | 222/341 |
| 3,145,690 A * | 8/1964 | Bachman | .................. | 119/52.3 |
| 3,537,624 A * | 11/1970 | Hartman et al. | .................. | 222/503 |
| 4,144,842 A * | 3/1979 | Schlising | .................. | 119/52.3 |
| 4,646,686 A * | 3/1987 | Furlani | .................. | 119/57.9 |
| 4,798,337 A * | 1/1989 | Shimokawa | .................. | 239/570 |
| RE32,970 E * | 7/1989 | Furlani | .................. | 119/52.3 |
| 5,138,979 A * | 8/1992 | Baird et al. | .................. | 119/51.04 |
| 5,195,459 A * | 3/1993 | Ancketill | .................. | 119/57.9 |
| 5,285,748 A * | 2/1994 | Weldin | .................. | 119/57.9 |
| 5,289,796 A * | 3/1994 | Armstrong | .................. | 119/52.3 |
| 5,445,109 A * | 8/1995 | Gray et al. | .................. | 119/57.9 |
| 5,641,096 A * | 6/1997 | Robbins et al. | .................. | 222/284 |
| 5,720,238 A * | 2/1998 | Drakos | .................. | 119/57.9 |
| 5,829,383 A * | 11/1998 | Blanding | .................. | 119/52.3 |
| 6,253,707 B1* | 7/2001 | Cote | .................. | 119/57.9 |
| 6,543,384 B2* | 4/2003 | Cote | .................. | 119/57.9 |
| 6,591,781 B2* | 7/2003 | Hardison | .................. | 119/57.9 |
| 6,604,487 B2* | 8/2003 | Lush | .................. | 119/57.9 |
| 6,640,746 B1* | 11/2003 | Lund | .................. | 119/57.9 |
| 6,758,164 B2* | 7/2004 | Rich | .................. | 119/52.3 |
| 6,918,353 B1* | 7/2005 | Coroneos | .................. | 119/57.1 |
| 6,945,192 B2* | 9/2005 | Cote | .................. | 119/57.9 |
| 2005/0115988 A1* | 6/2005 | Law et al. | .................. | 222/145.5 |

* cited by examiner

*Primary Examiner*—Yvonne R. Abbott
(74) *Attorney, Agent, or Firm*—Eric Fincham

(57) ABSTRACT

A bird feeder for deterring squirrels and other marauders, the bird feeder having an inner feed container and an outer shroud, the spring mechanism being mounted in a center structure which comprises an outer first member having a hollow interior portion with a second plunger member mounted interiorly of the hollow member, the plunger having an upper stop member and a lower stop member with a spring mounted between the lower stop member and the base, the shroud being connected to an exteriorly extending portion of the plunger member.

14 Claims, 17 Drawing Sheets

TUBE BIRD FEEDER

FIELD OF THE INVENTION

The present invention relates to bird feeders, and more particular, relates to selective bird feeders.

BACKGROUND OF THE INVENTION

Selective bird feeders are well known in the art and are designed to limit the maximum size of a bird or animal which can access the seeds in the feeder. There are many reasons for excluding certain birds and animals including the fact that certain birds may be regarded as undesirable. Thus, many people only wish to have the smaller birds present at the feeder and not the larger birds. Some of the larger birds such as crows, grackles, blue jays and the like are considered by some people to be undesirable.

A further problem associated with bird feeders is those animals which gain access to the seeds and which can devour a large quantity of seeds in a relatively short period of time. Squirrels in particular are well known for their ability to reach the seeds in bird feeders and have shown great ingenuity in overcoming many devices such as baffles which have been utilized in an attempt to solve the problem.

One of the more popular types of bird feeders which are often referred to as squirrel proof are those which use a movable shroud. Thus, one may refer to U.S. Pat. No. 4,646,686 to Furlani which teaches a movable shroud. A slightly different arrangement is shown in U.S. Pat. No. 3,145,690 to Bachman wherein there is an arrangement wherein an inverted cylinder hopper is suspended over a feeding pan while a bird perch surrounds the pan and is attached to a conical shroud. Heavier birds or animals on the perch cause the shroud to move downwardly.

Other arrangements are shown in U.S. Pat. Nos. 3,126,870; 6,543,384; 6,253,707 and 6,591,781. All of the teachings thereof are incorporated herein by reference.

SUMMARY OF THE INVENTION

It is an object of the present invention to provide an adjustably selective bird feeder having a movable shroud to protect and isolate the access opening by which the birds can gain access to the seeds in the container from unwanted intruders.

According to one aspect of the present invention, there is provided a bird feeder comprising a feed container defined by a wall, at least one feed container access opening in the wall, a base secured to a bottom portion of the feed container, a center structure including a first member located interiorly of the feed container, the first member of the center structure extending substantially the length of the feed container, the first member being secured to the base, the first member having a lower interior hollow portion, the plunger mounted interiorly of the hollow portion of the first member, the plunger extending to the base and having a portion extending exteriorly thereof, the plunger having an upper stop member and a lower stop member, a spring mounted between the lower stop member and the base, a shroud extending about the feed container, the shroud being connected to the exteriorly extending portion of the second member, at least one shroud access opening substantially aligned with the feed container access opening to thereby permit access to the feed container and a cover member.

In greater detail, the bird feeder of the present invention will include a feed container which may be of any desired configuration—circular, square, etc. The feed container is preferably formed of a relatively transparent plastic material such that visual access may be had to the interior so as to verify the contents, etc.

As in other bird feeders of this type, there is provided a shroud which extends about the feed container and which shroud is designed to prevent access to the feed by unwanted creatures. The shroud will, in a preferred embodiment, comprise a metallic grid with openings small enough to prevent access being gained to the feed container. Adjacent the feed container access opening, the grid will be even smaller. The shroud moves coaxially with the feed container when a weight is placed thereon. Naturally, other structures such as sheet material having apertures therein may be used.

The feed container will have, in the bottom portion thereof, a base which is secured thereto. Preferably, the base will have drainage means such that liquid such as rain will readily drain therefrom.

The bird feeder incorporates a center structure which will include at least a first member and a plunger which are located interiorly of the feed container. This protects the operating mechanism (as will be discussed hereinbelow) from exposure to the weather or squirrel damage.

The first member of the center structure extends substantially the entire length of the feed container and in essence, ties many parts of the structure together. The first member is, at its lower end, attached to the base or its equivalent.

At its lower portion, the first member has a hollow interior in which a plunger operates. The plunger is moveable within the first member and is biased upwardly by a spring member. The spring member sits on the base and extends about the plunger. There are provided upper and lower stops on the plunger. The lower stop has one end of the spring member seated there against, while the upper stop will engage against the first member. The plunger also has a portion thereof extending exteriorly of the base and which portion is secured to the shroud.

Different types of cover members may be employed. In one embodiment, the cover member will be biased upwardly by spring biased members on the shroud. In this arrangement, there will be provided a recess in a side wall of a top collar to receive a protrusion formed on the cover.

In a further embodiment, the cover may be latched by outwardly extending protrusions on the collar.

Preferably, the bird feeder will include perches and to this end, several different arrangements can be employed. In a first embodiment, perches which are hingedly connected to the shroud may be utilized. In an alternative embodiment, a spring type arrangement may be utilized wherein the coil is screw threadedly engaged with an outwardly extending perch mount which is connected to the shroud. This arrangement provides a secure mounting while also functioning to deter heavier birds or animals from alighting thereon.

BRIEF DESCRIPTION OF THE DRAWINGS

Having thus generally described the invention, reference will be made to the accompanying drawings illustrating embodiments thereof, in which.

DETAILED DESCRIPTION OF THE DRAWINGS

Figure 1:
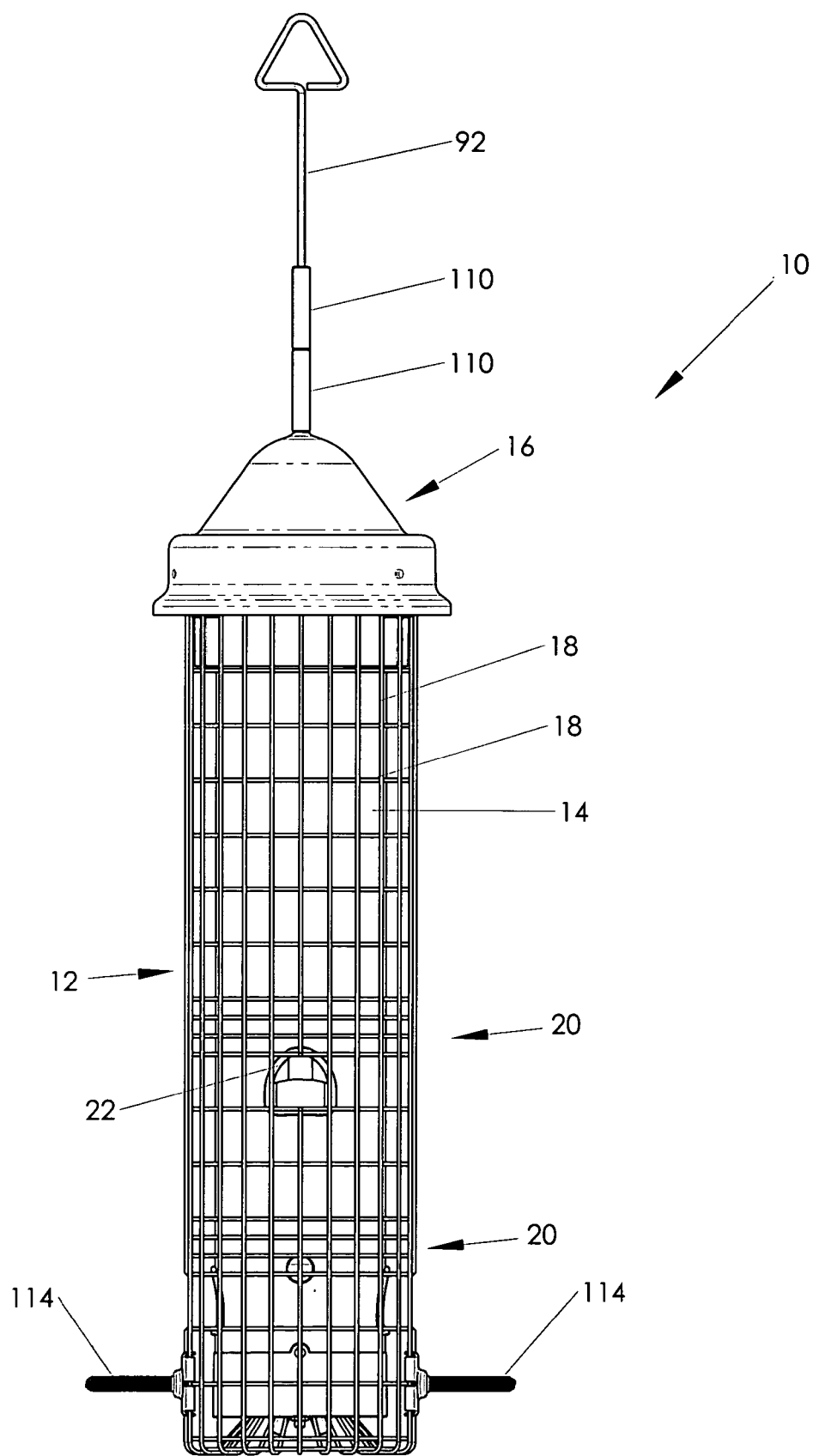
FIG. 1 is a side elevational view of a bird feeder according to one embodiment of the present invention.
Figure 2:
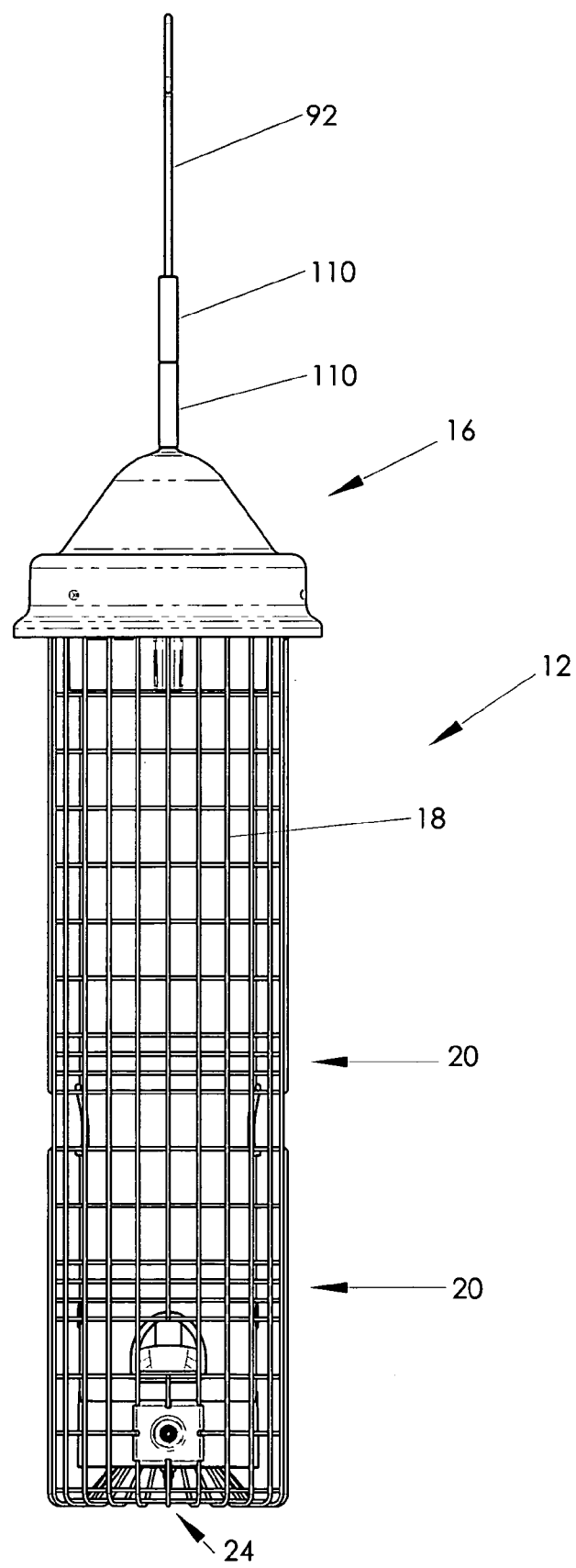
FIG. 2 is a side elevational view of the bird feeder of FIG. 1 turned through 90°.
Figure 3:
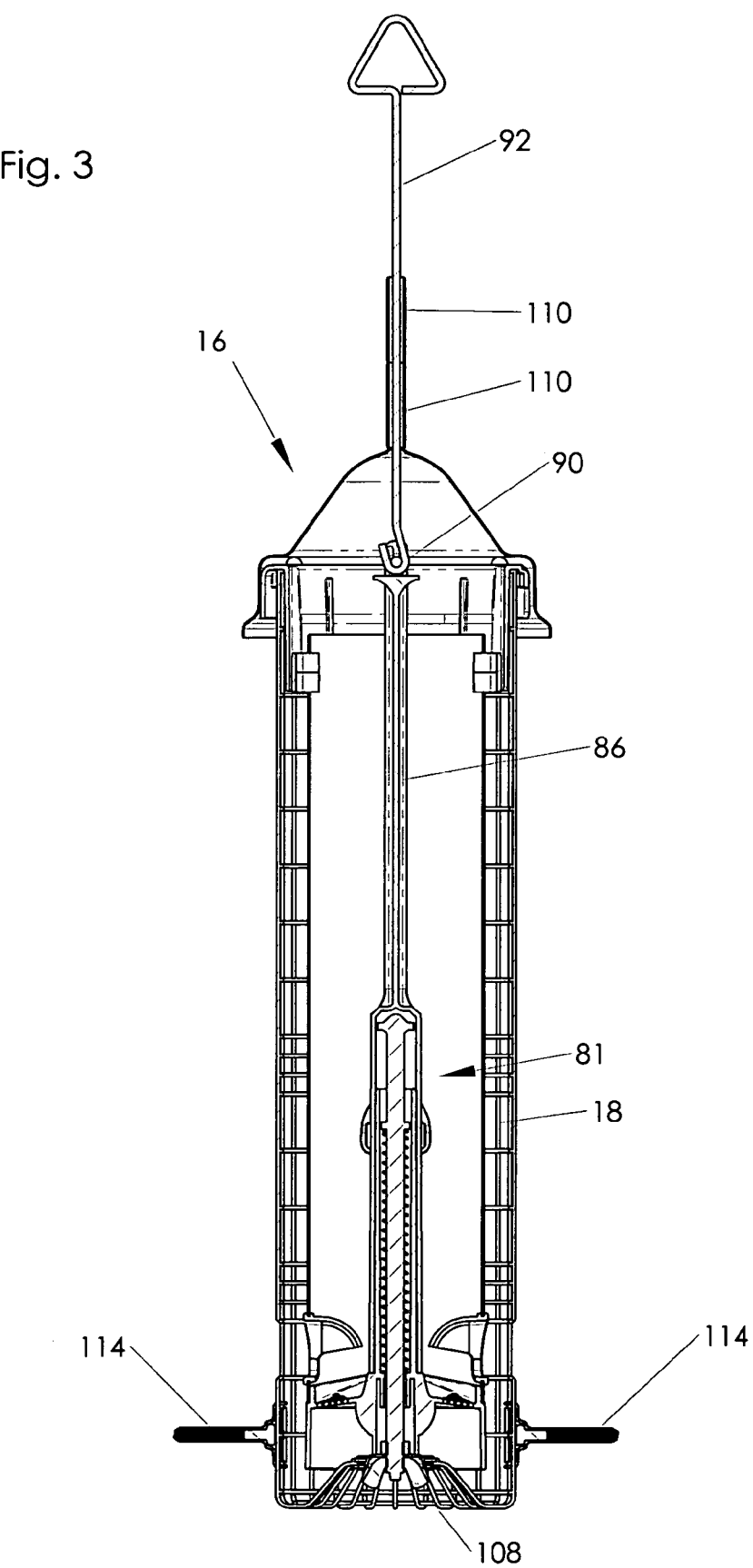
FIG. 3 is a side sectional view of the bird feeder.
Figure 4:
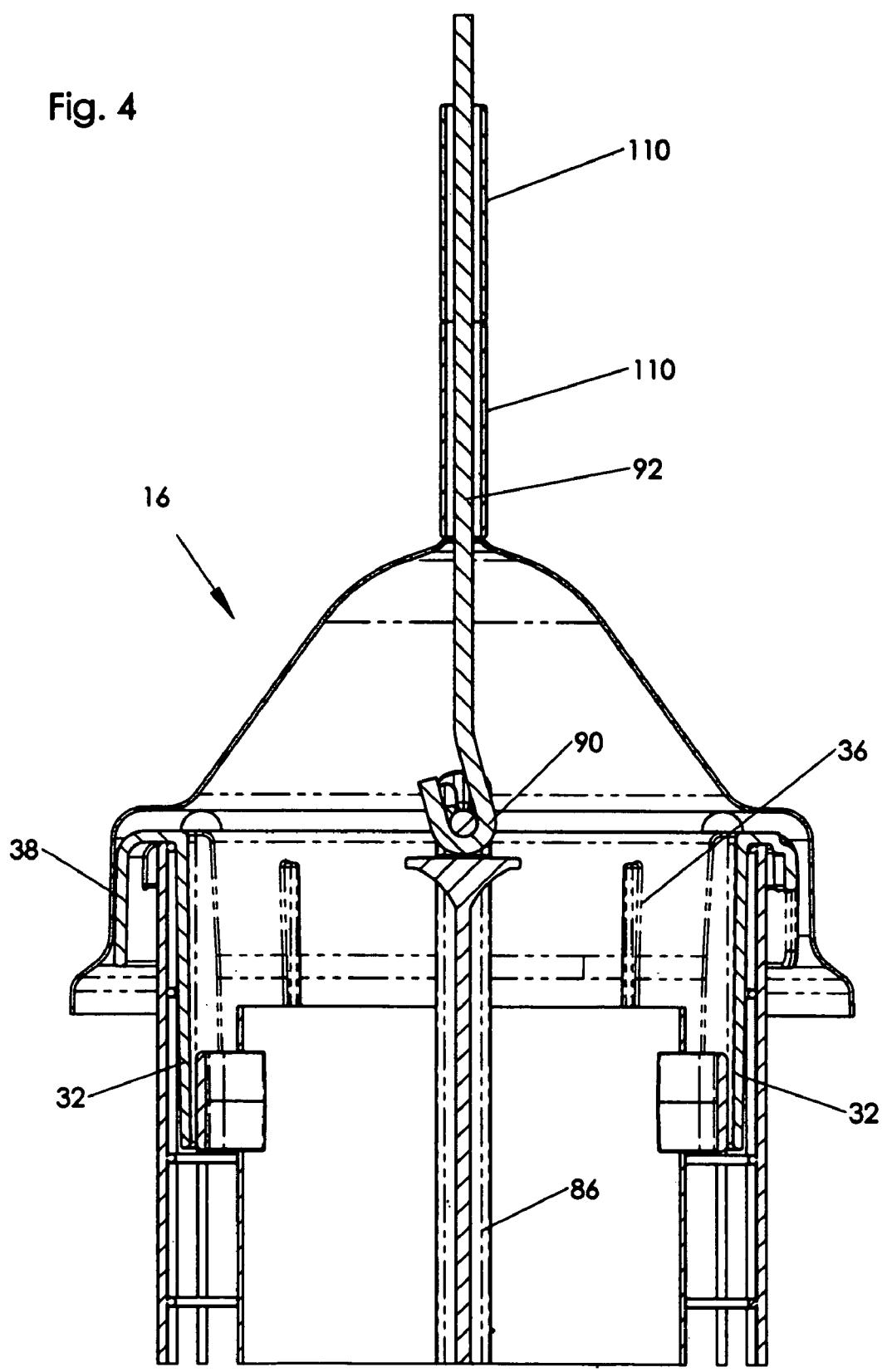
FIG. 4 is an enlarged view of the top portion of FIG. 3.
Figure 5:
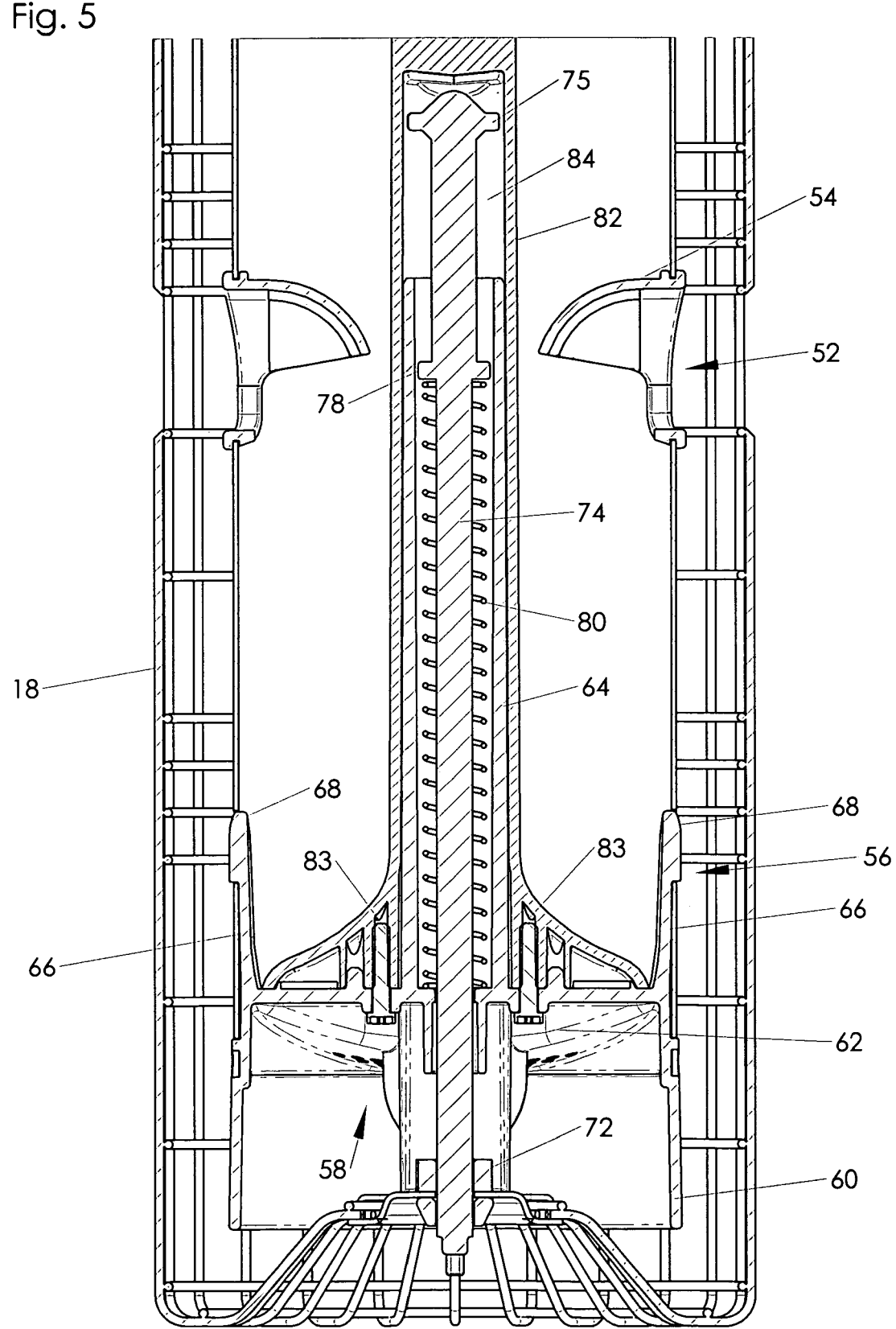
FIG. 5 is an enlarged view of the bottom portion of FIG. 3.
Figure 6:
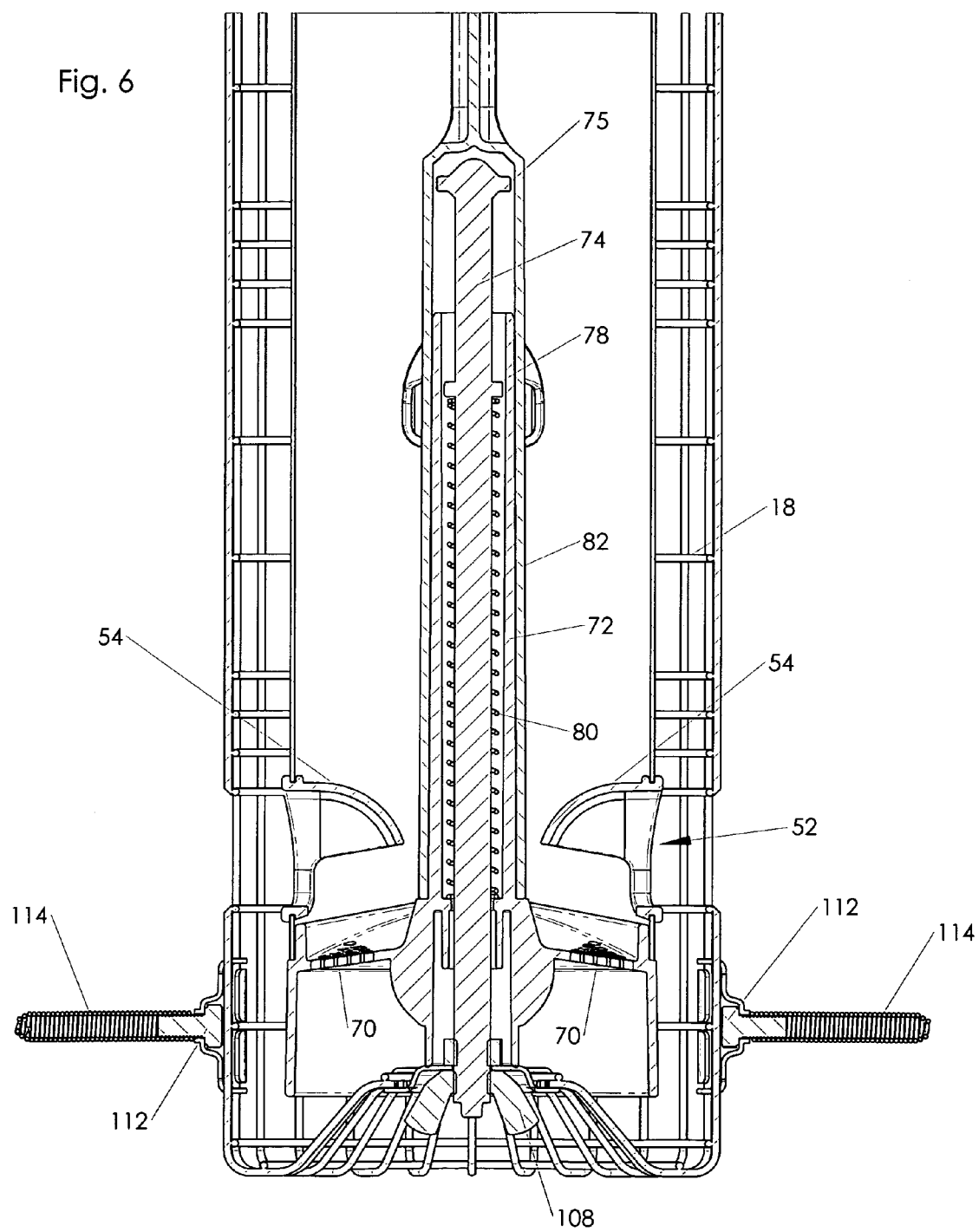
FIG. 6 is a view similar to FIG. 5, but with the bird feeder turned through 90°.
Figure 7:
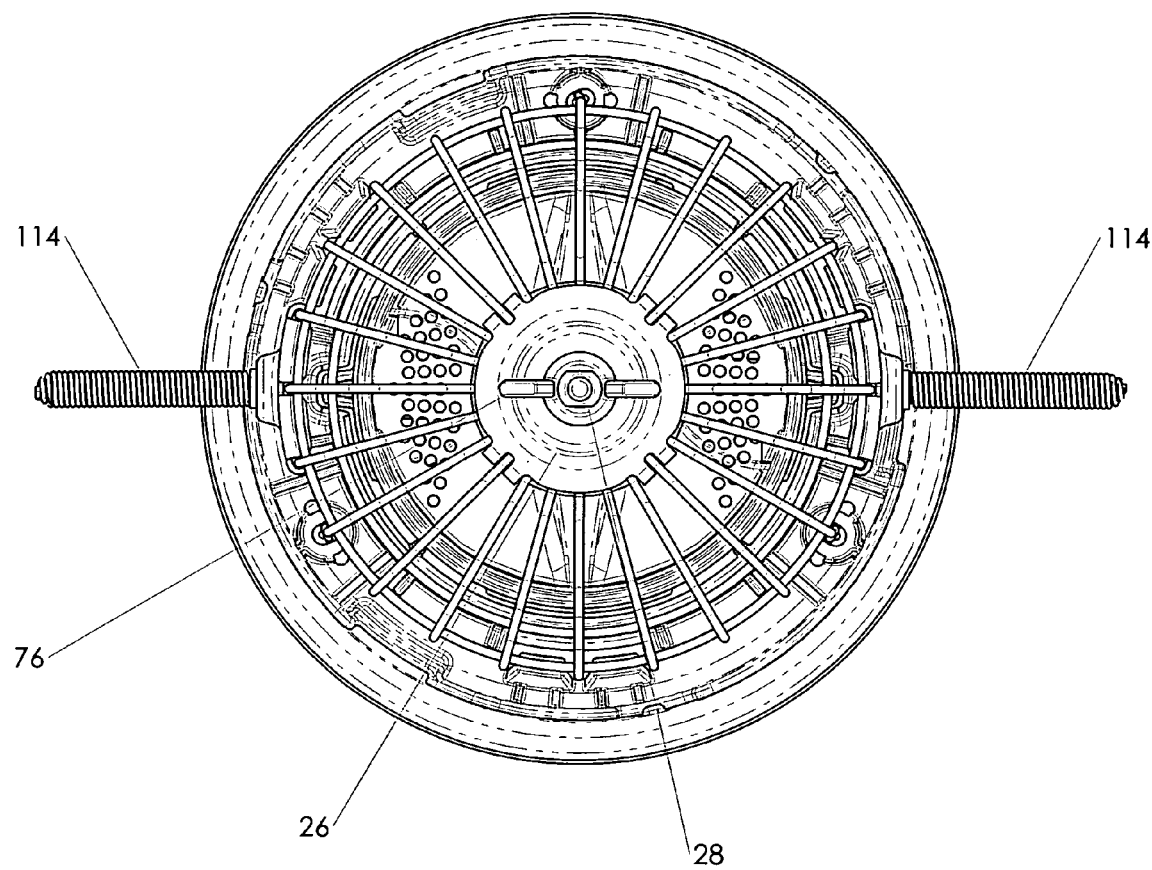
FIG. 7 is a bottom view of the bird feeder of FIG. 1.

Referring to the drawings in greater detail and by reference characters thereto, there is illustrated in FIGS. 1 to 9 a first embodiment of a bird feeder and which bird feeder is generally designated by reference numeral 10.

Bird feeder 10 includes an outer shroud generally designated by reference numeral 12, a feed tube generally designated by reference numeral 14, and a cover generally designated by reference numeral 16.

Outer shroud 12 is formed of a wire grid 18 and is designed to substantially surround feed tube 14. As may be seen, there are provided portions wherein the wires are closely spaced together and which wires are generally designated by reference numeral 20 as well as portions having openings generally designated by reference numeral 22. As will be appreciated, where the wires are closely spaced, the purpose is to deny access to the feed tube, while, in a normal mode, openings 22 provide access to the feed tube.

Outer shroud 12 has a concave bottom 24, and which includes a solid center portion 26 having an aperture 28 therein.

Figure 8:
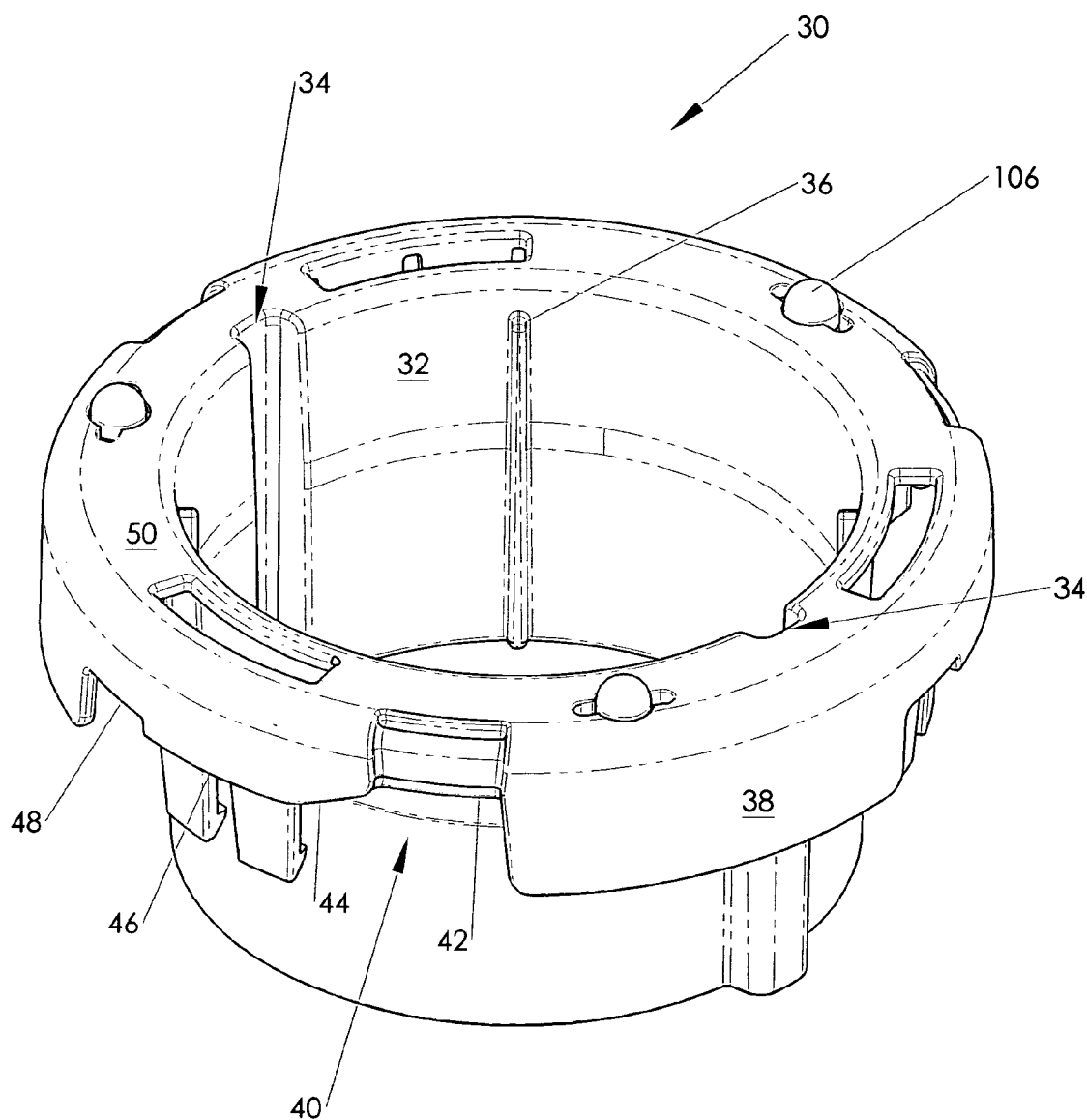
FIG. 8 is a perspective view of the collar member of the bird feeder of FIG. 1.

A collar member is generally designated by reference numeral 30 and is best illustrated in FIG. 8. Collar member 30 includes an inner wall 32 having a pair of diametrically opposed grooves 34 therein as well as a plurality of ribs 36 formed thereon. Collar 30 also includes an outer wall 38 which as a plurality of recessed portions 40. As may be seen in FIG. 8, outer wall 38 has, in each recessed portion 40, a lower marginal edge 42 which is substantially parallel with a top wall 50. Adjacent to each straight marginal edge 42, there is provided a tapered marginal edge section 44 which in turn merges with a straight marginal edge section 46. From straight marginal edge section 46, there is provided a recessed marginal edge portion 48 for reasons which will become evident hereinbelow.

Feed tube 14 includes a plurality of feed openings 52 as is well known in the art, with each opening 52 having a baffle 54 associated therewith. In addition, there is provided a pair of diametrically opposed sidewall apertures 56 for reasons discussed hereinbelow.

Bird feeder 10 includes a base 58 having a skirt 60 extending downwardly therefrom. A concave shape bottom wall 62 has a plurality of drainage apertures 70 located therein.

Base 58 includes an upwardly extending center member 64 along with a pair of tab members 66 each having a locking protrusion 68 and which are designed to engage diametrically opposed sidewall apertures 56 to thereby lock the structure together.

Bird feeder 10 has a center structure generally designated by reference numeral 81. The center structure includes an outer tube 82 having a cavity 84 at the bottom and thereof. An upper solid portion 86 extends upwardly from the lower portion and has an aperture (not shown) located therein proximate the top thereof. As may be seen in FIG. 5, fastening members 83 secure outer tube 82 in position.

Interiorly of outer tube 82 and within cavity 84 is center member 64 and interiorly of which is mounted a plunger 74. Plunger 74 extends downwardly through the base and shroud 12 and is secured in position by wingnut 108. Plunger 74 includes an upper stop member 75 and a lower stop member 78. A spring 80 is mounted about plunger 74 between lower stop member 78 and the bottom of cavity 84. Plunger 74 also has a "flat spot" to prevent rotation thereof when tightening nut 72 which retains plunger 74 in position.

The aperture in the top of solid portion 86 is designed to receive a hook portion 90 of a hanger 92.

Figure 9:
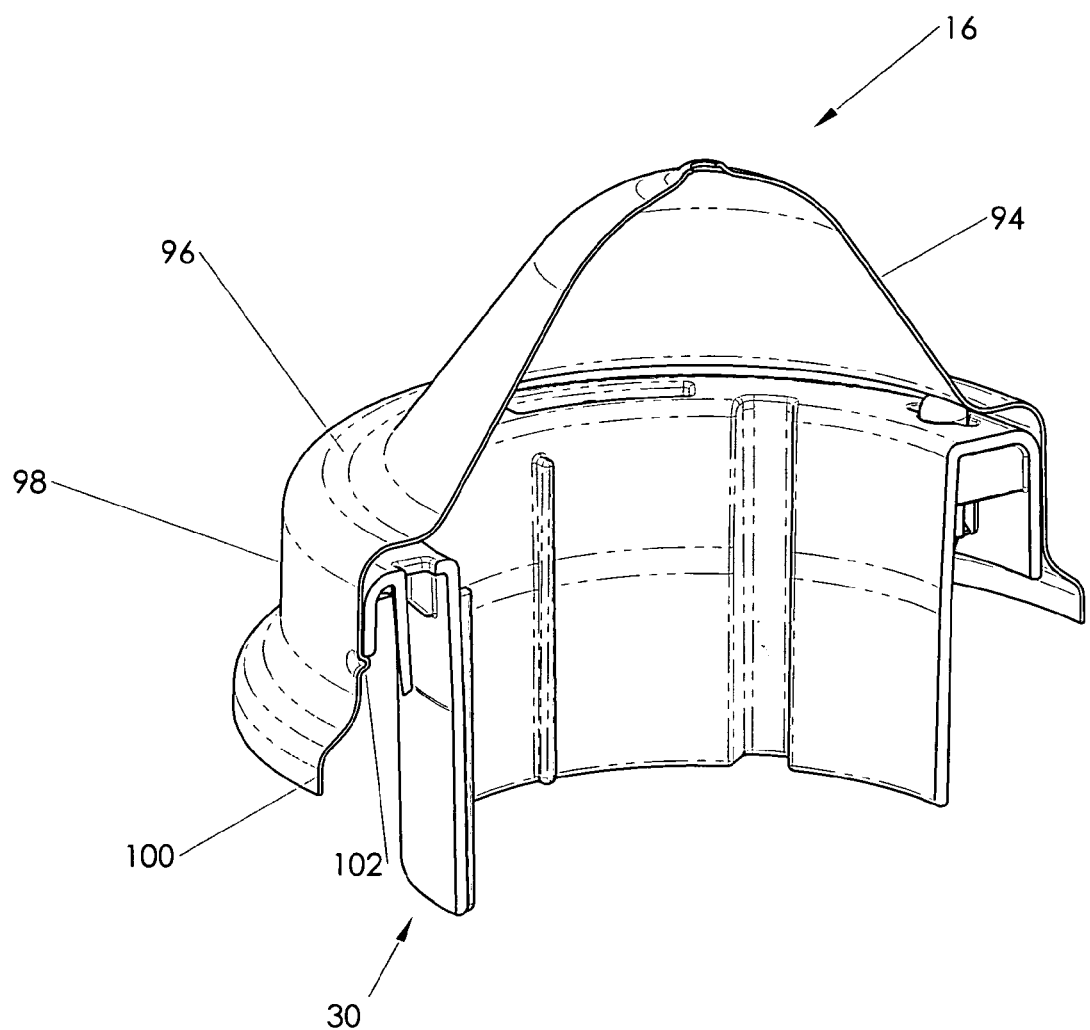
FIG. 9 is a cut-away of the collar and cover.
Figure 10:
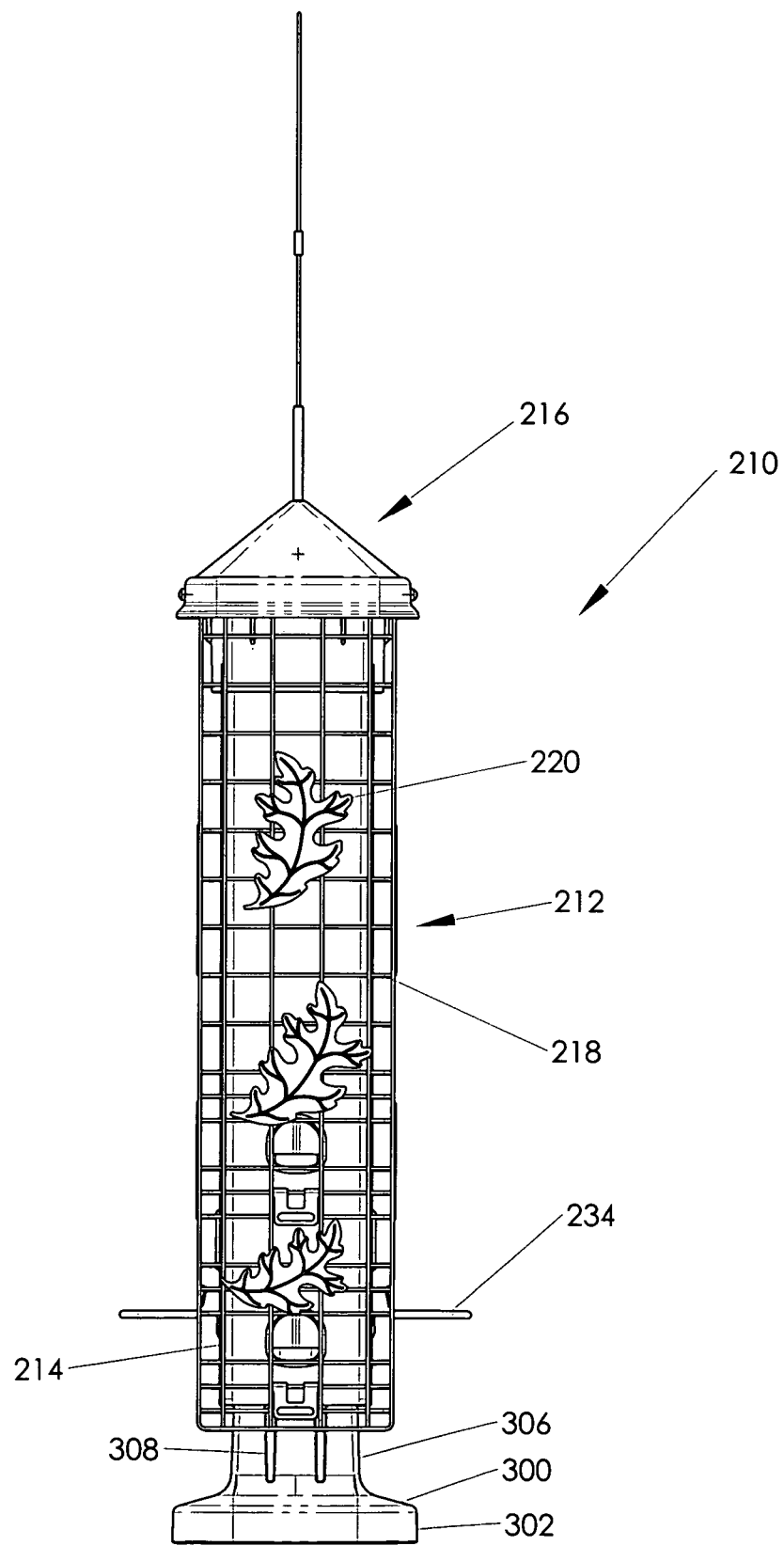
FIG. 10 is a side elevational view of a further embodiment of a bird feeder according to the present invention.
Figure 11:
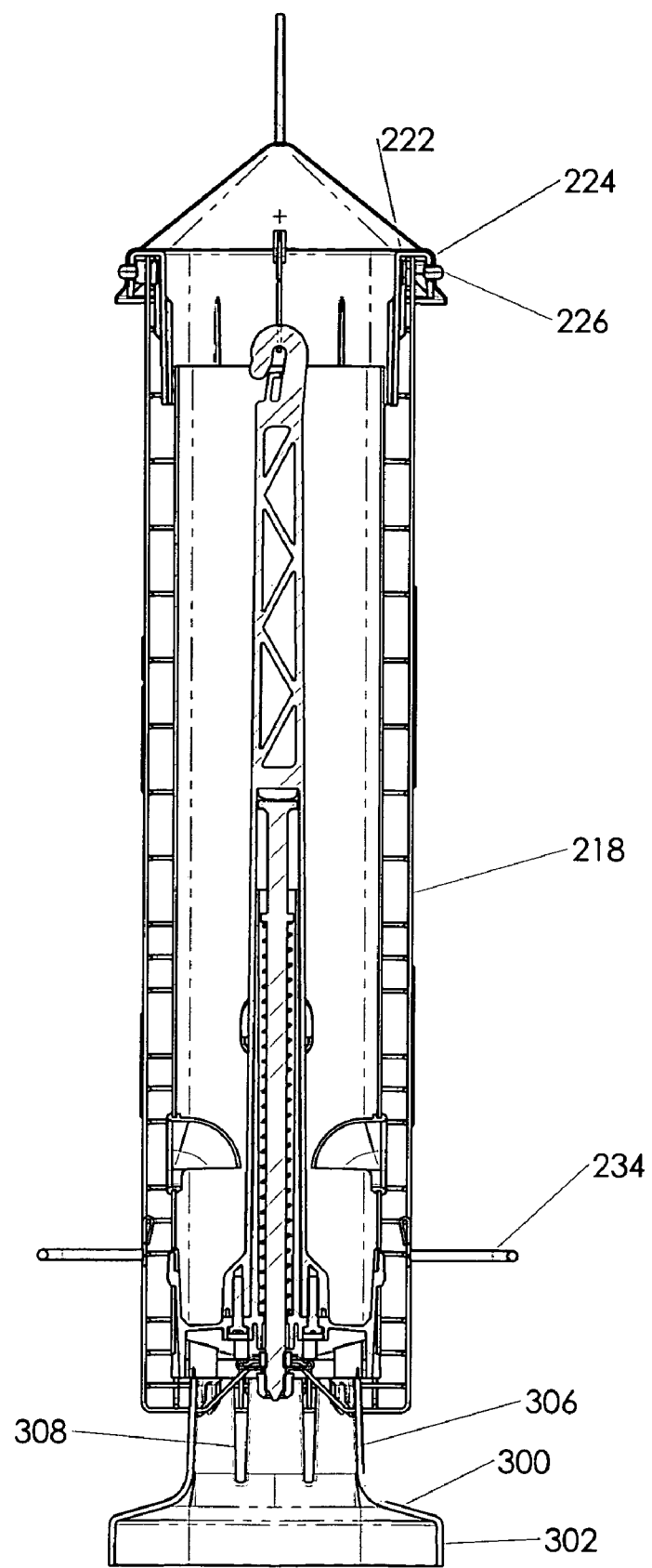
FIG. 11 is a side sectional view of the bird feeder of FIG. 10.
Figure 12:
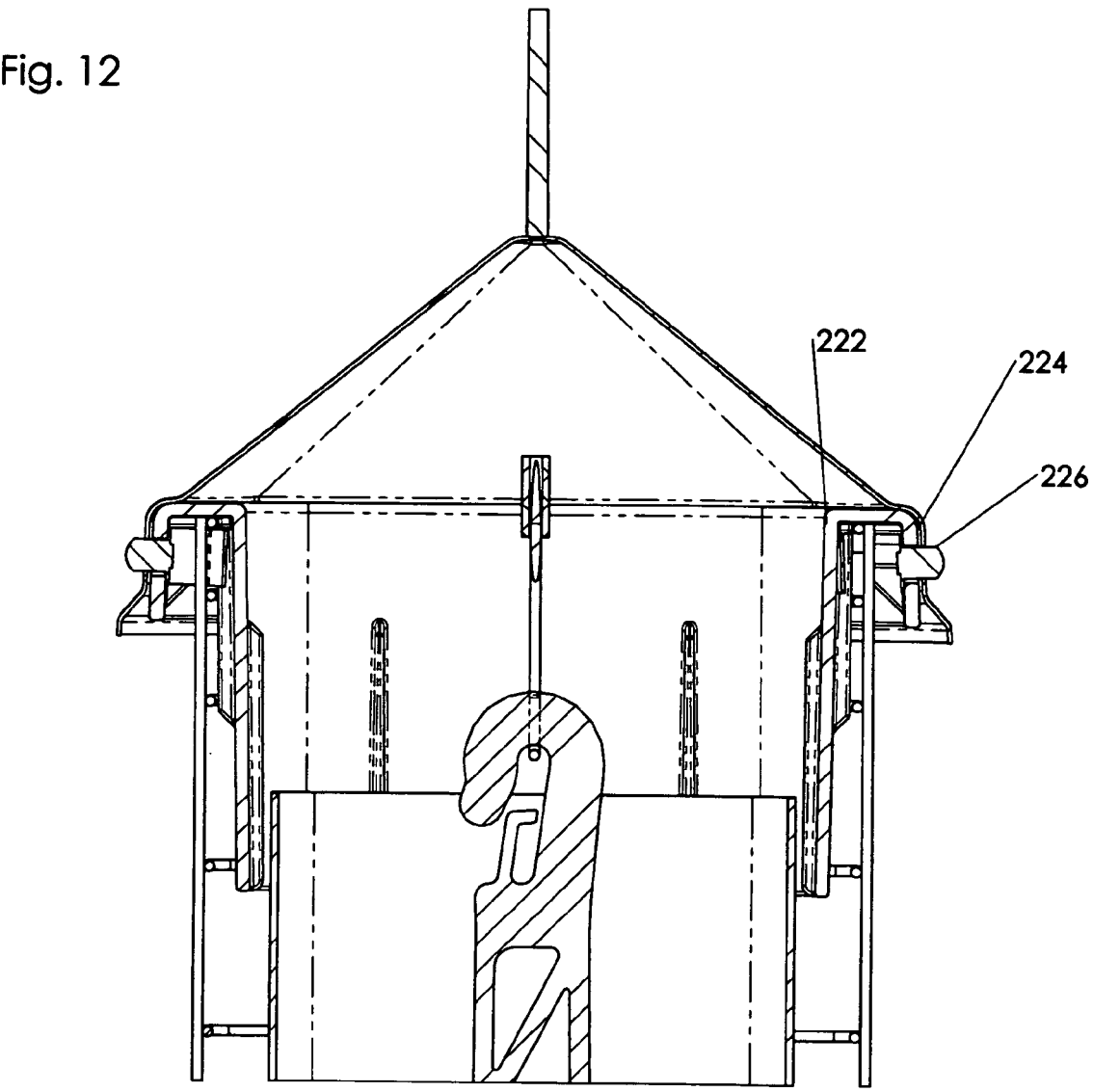
FIG. 12 is an expanded view, in cross section; of the upper portion thereof.
Figure 13:
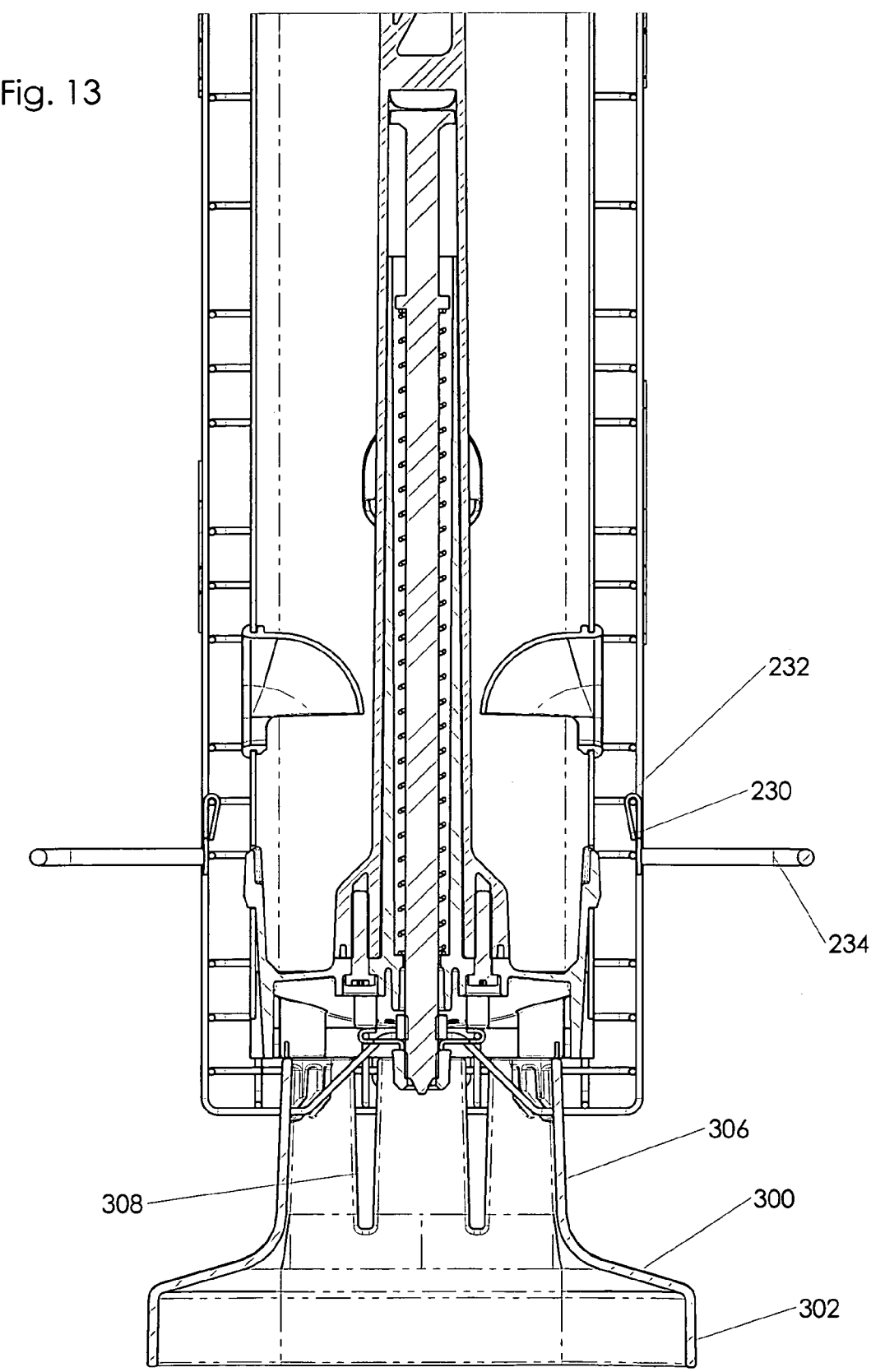
FIG. 13 is an expanded sectional view of the bottom portion thereof.
Figure 14:
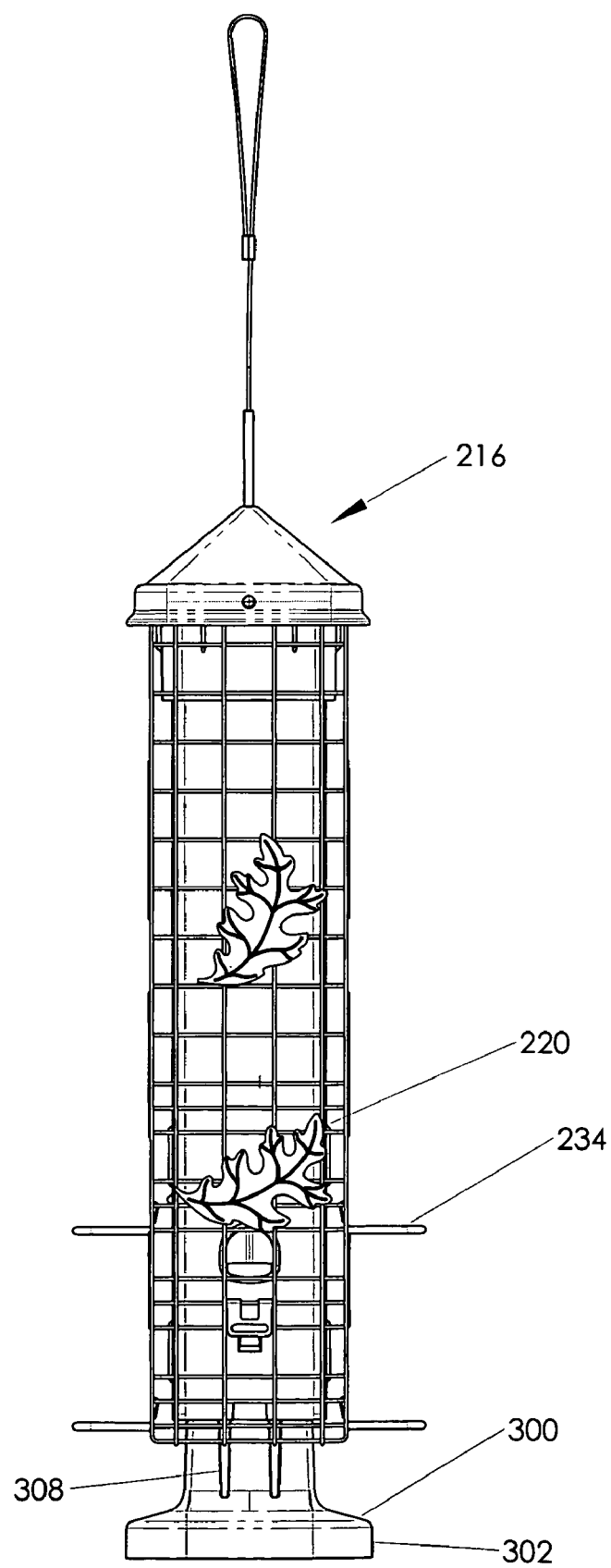
FIG. 14 is a side elevational view similar to that of FIG. 10, but with the bird feeder rotated through 90°.
Figure 15:
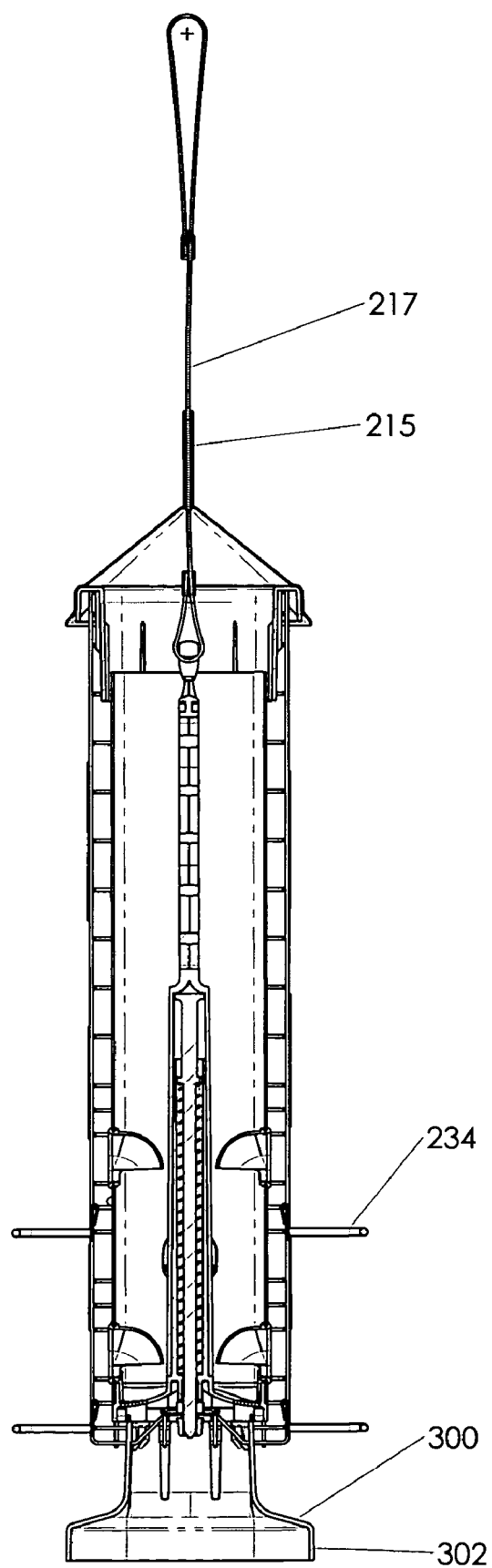
FIG. 15 is a cross sectional view of the bird feeder of FIG. 14.
Figure 16:
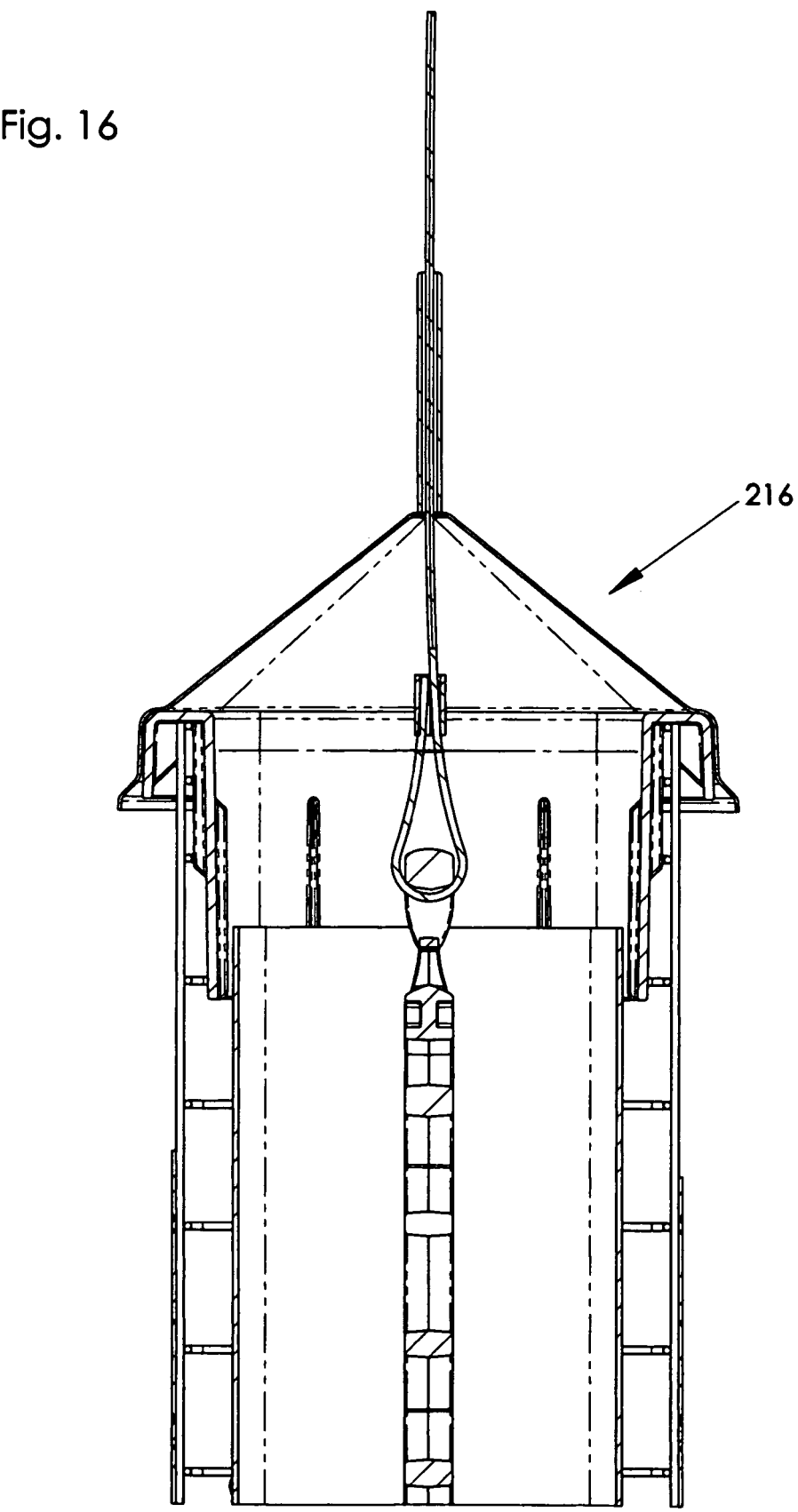
FIG. 16 is an expanded view of the upper portion of FIG. 15.
Figure 17:
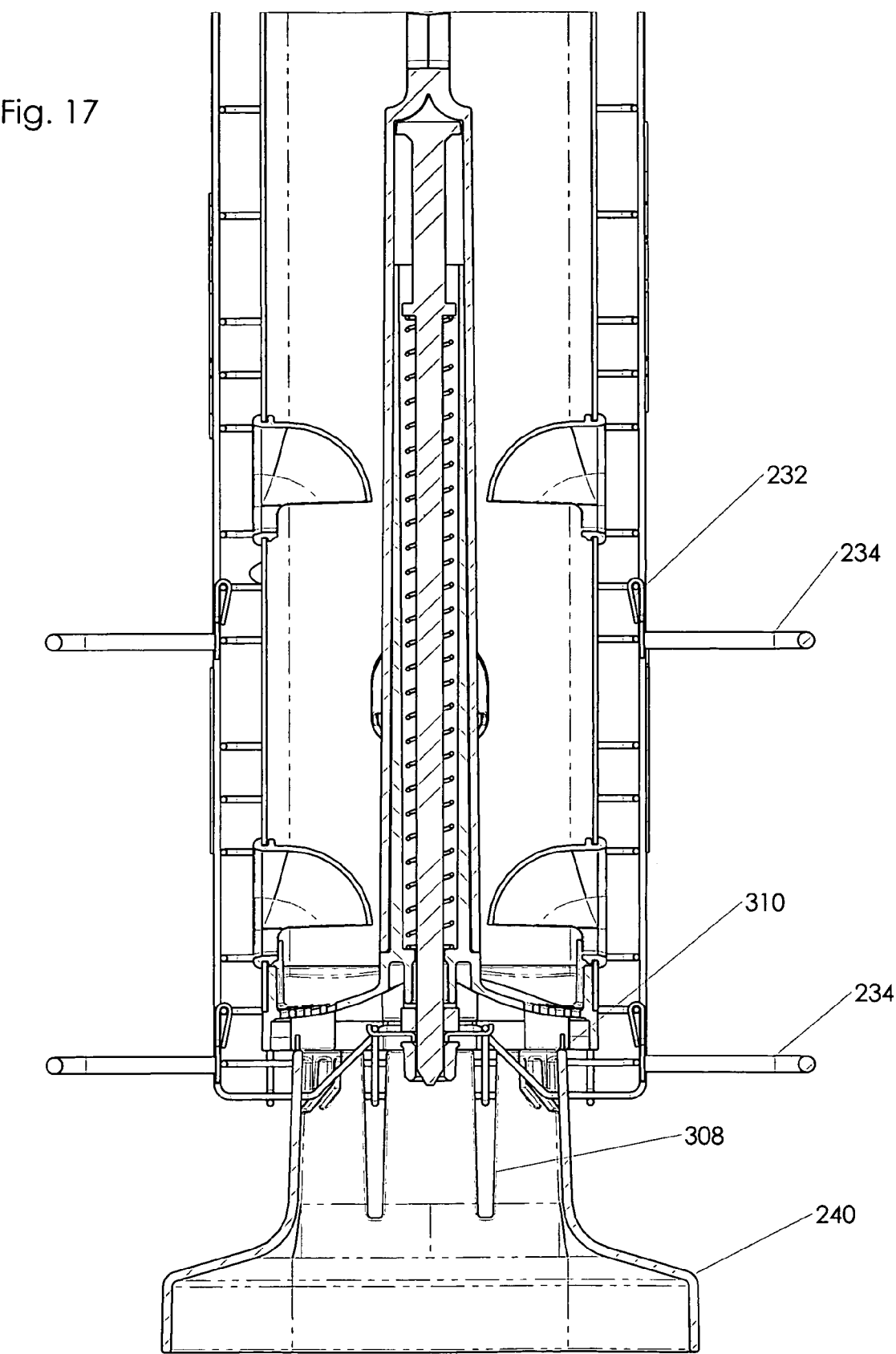
FIG. 17 is an expanded view of the lower portion of FIG. 15.

Cover 16, as may be seen in FIG. 9, includes an upper dome portion 94, a horizontal wall section 96, a vertical wall section 98, and a skirt 100. Extending inwardly from vertical wall section 98 are protrusions 102 which are designed to engage with outer wall 38 of collar 30 and in particular, the protrusions 102 permit the cover 16 to be placed with the protrusion passing through recessed portion 40 and the cover may be rotated along marginal edges 42, 44, 46 into recessed portion 48. Collar 30 also includes, in top wall 50, a plurality of recesses each of which has a spring therein and which urges biasing members 106 upwardly. Thus, the biasing members 106 keep the cover in the locked position.

As an alternative to the use of dimples as protrusions 102, a punch out may form the protrusion, the punch out leaving a portion of the material attached thereto.

In the illustrated embodiment, a pair of negative grip tubes 110 are utilized. Negative grip tubes 110 are rigid cylindrical members which are located on hanger 92 and are freely moveable therealong. Negative grip tubes 110 prevent a squirrel grasping hanger 92 with its rear feet and hanging downwardly to gain access to the feed container.

A plurality of perch mounts 112 are connected to shroud 12 and include an outwardly extending stub portion having a screw thread thereon. Perches 114, which comprise a coiled member, may then be attached onto the stub mounts. In this respect, the flexible spring perch has a slightly smaller interior diameter than the outside diameter of the stub post. This creates a pressure on a post that is effective to maintain the perch in position.

In order to tie the structure together, a wing nut 108 is screw threadedly engaged with the lower portion of plunger 74. Thus, any downward pressure on shroud 12 is transmitted to plunger 74 and the shroud will move downwardly. Spring member 80 will return the shroud to its operative position when the weight has been removed.

A further embodiment of the present invention is illustrated in FIGS. 10 to 17 and will not be referred to. In this regard, many of the components are identical or very similar and thus, reference numerals in the 200's will be used for such similar components.

Bird feeder 210 includes outer shroud 212 a feed tube 214, and a cover 216. As many of the components are similar, only portions of the bird feeder 210 will be described herein.

Bird feeder 210 has a rectangular configuration and the shroud includes a wire grid 218 having decorative elements 220 thereon. Decorative elements 210 may replace the closely spaced portions of the previously described embodiment.

A collar inner wall 222 and a collar outer wall 224 are arranged such that spheres 226 are biased outwardly and are arranged to engage cover 216 to secure the same in place.

Perches 234 have a base portion 230 which is retained in position on the horizontal wires of wire grid 218 by means of hook section 232 which extends about one of the wires. Extending outwardly from base 230 are U-shaped perching portions 234. The arrangement is such that perches can rotate upwardly about hook sections 232.

In this embodiment, there is also provided a base member generally designated by reference numeral 300 and which includes a base portion 304 having a skirt 302 extending downwardly therefrom. Vertical walls 306 have slots 308 formed therein. At the four corners of vertical walls 306, there are provided locator pens 310. Thus, locator pens 310 are arranged to fit within recesses formed in base 258. Slots 308 permit the downward movement of the wire grid through the slots.

Member 300 is also designed and sized such that when inverted, it will fit within feed tube 214 and thus may be used as a funnel when placing seed therein.

As was the case with the previous embodiment, there are also provided negative grip cylindrical members 215 which extend about a flexible hanging cable 217.

It will be understood that the above described embodiments are for purposes of illustration only and that changes and modifications may be made thereto without departing from the spirit and scope of the invention.

I claim:

1. A bird feeder comprising:
   a feed container defined by a wall, at least one feed container access opening in said wall;
   a base secured to a bottom portion of said feed container;
   a center structure including a first member located interiorly of said feed container;
   said first member of said center structure extending substantially the length of the feed container, said first member being secured to said base, said first member having a lower interior hollow portion;
   a plunger mounted interiorly of said hollow portion of said first member, said plunger extending to said base and having a portion extending exteriorly thereof, said plunger having an upper stop member and a lower stop member, a spring mounted between said lower stop member and said base;
   a shroud extending about said feed container, said shroud being connected to the exteriorly extending portion of said plunger member, at least one shroud access opening substantially aligned with said feed container access opening to thereby permit access to said feed container; and
   a cover member.

2. The bird feeder of claim 1 further comprising a hanger, said hanger being secured to an upper portion of said first member, said hanger extending through said cover.

3. The bird feeder of claim 2 further including at least one negative grip tube member located between said cover and a free end of said hanger extending about said hanger, said negative grip tube member being free to move along said hanger.

4. The bird feeder of claim 1 wherein said cover member is biased upwardly into a locking position by means of spring members.

5. The bird feeder of claim 1 wherein cover is secured to said shroud by means of spring biased protrusions extending through an inside wall of said cover.

6. The bird feeder of claim 1 further comprising a top collar, said top collar having an inner wall extending downwardly between said shroud and said feed container, a top wall extending over said shroud, and an outer wall extending exteriorly of said shroud.

7. The bird feeder of claim 6 further including a plurality of upwardly extending spring biased members, said upwardly extending spring biased members being arranged to seat against a surface of said cover to bias said cover upwardly.

8. The bird feeder of claim 7 wherein said outer wall of said top collar has a recess formed therein, said cover having at least one inwardly extending protrusion arranged to fit within said recess.

9. The bird feeder of claim 6 wherein said inner wall has a vertically extending groove formed therein, and said seed container has an outwardly extending guide member arranged to fit within said groove such that when the shroud moves downwardly, said guide member remains within said groove.

10. The bird feeder of claim 6 wherein an upper portion of said seed tube is protected by said inner wall of said top collar.

11. The bird feeder of claim 6 wherein said top collar has ribs on said inner wall to center said feed container.

12. The bird feeder of claim 1 further including a plurality of perches connected to said shroud.

13. The bird feeder of claim 12 wherein said perches are hingedly connected to said shroud.

14. The bird feeder of claim 1 further including a baffle associated with said feed container access opening.

* * * * *